Nov. 8, 1960 E. W. BECK 2,959,354
BUCK LURE
Filed April 10, 1959
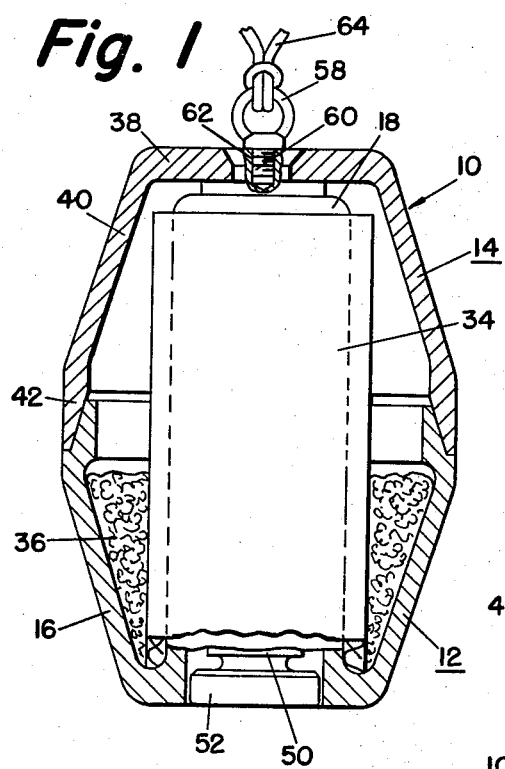
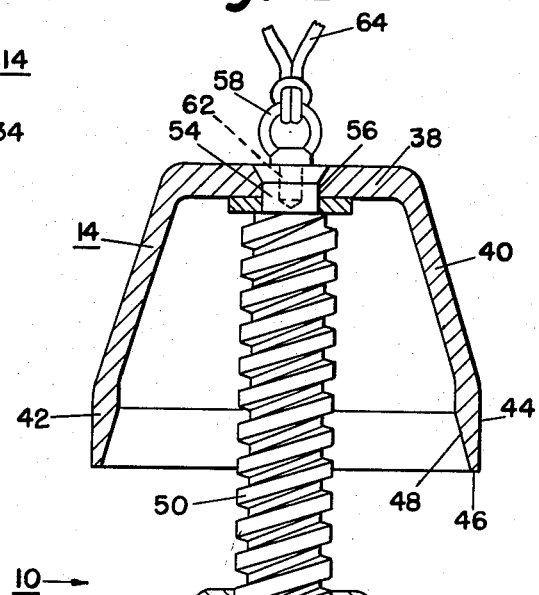
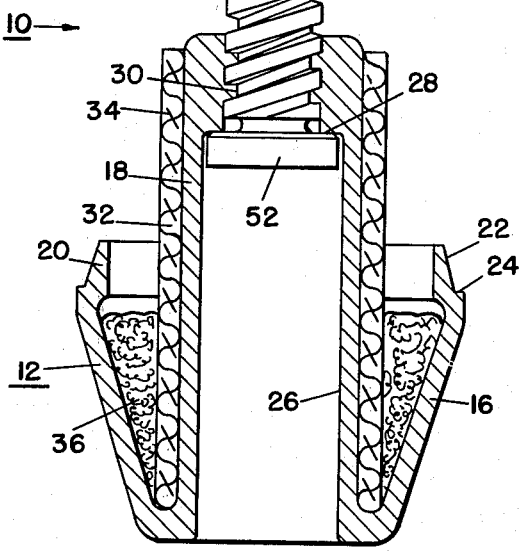
INVENTOR.
EDWARD W. BECK
BY Arthur H. Seidel
ATTORNEY

2,959,354

BUCK LURE

Edward W. Beck, 613 Parkview Blvd., Yeadon, Pa.

Filed Apr. 10, 1959, Ser. No. 805,449

12 Claims. (Cl. 239—36)

The present invention relates to a buck lure, and more particularly to a buck lure of the type which is carried on the person of the hunter and gives off the odor of a doe.

A type of buck lure used by hunters is a liquid which gives off the odor of a doe. This liquid is commonly used by saturating a wad of cotton with the liquid, and by carrying the wad of cotton in a pocket of the hunter's coat so as to attract the buck to the hunter. This liquid has a very strong, and rather unpleasant odor. Since the hunter carries the saturated wad of cotton in his pocket, the odor from the liquid permeates the hunter's clothing, and provides the hunter's clothing with an unpleasant odor which is retained long after the hunting session is over. Therefore, it would be desirable to have a buck lure which can be safely carried on the person of the hunter without adversely affecting the hunter's clothing, yet will provide the desired lure odor when the hunter is actually hunting.

It is an object of the present invention to provide a novel buck lure.

It is another object of the present invention to provide a buck lure which will give off the odor of a doe, and which can be carried by the hunter without adversely affecting the hunter's clothing.

Other objects will appear hereinafter.

For the purpose of illustrating the invention there is shown in the drawings a form which is presently preferred; it being understood, however, that this invention is not limited to the precise arrangements and instrumentalities shown.

Figure 1 is a sectional view, partly in elevation, of the buck lure of the present invention in its closed disposition.

Figure 2 is a sectional view of the buck lure of the present invention in its open disposition.

Referring to the drawing, the buck lure of the present invention is generally designated as 10. Buck lure 10 comprises a cup-shaped container member 12, and a cup-shaped cover member 14.

Container member 12 has a conical outer wall 16, and a cylindrical stem 18 integral with the bottom end of the outer wall 16 and projecting upwardly through the outer wall 16. Outer wall 16 has a lip 20 projecting upwardly from the top end of the outer wall 16. The outer surface 22 of lip 20 tapers downwardly and radially outwardly from the top end of the lip 20. The bottom end of the outer surface 22 of lip 20 is spaced radially inwardly from the outer surface of wall 16 so as to provide a narrow, radially extending ledge 24. Stem 18 projects beyond the top end of the lip 20. The stem 18 has a cylindrical bore 26 extending longitudinally therethrough from the bottom end of the stem 18 to a shoulder 28 which is spaced below the top end of the stem 18. A threaded hole 30, which is smaller in diameter than the bore 26, extends longitudinally through the stem 18 from the top end of the stem 18 to the bore 26. The outer surface of the stem 18 has a thread 32 extending the entire length of the stem 18.

A sleeve 34 of a woven, absorbent cloth material fits around the stem 18 of the container member 12. The inner diameter of the sleeve 34 is smaller than the outer diameter of the thread 32 on the outer surface of the stem 18, so that the sleeve 34 must be stretched to place the sleeve 34 around the stem 18. Thus, the resiliency of the fibers of the sleeve 34 pulls the sleeve 34 around the thread 32 so that the sleeve 34 is tightly secured to the stem 18. The outer wall 16 of the container member 12 is filled with an absorbent material 36, such as cotton.

Cover member 14 has a flat, circular top 38, and a conical wall 40 extending downwardly and radially outwardly from the top 38. A lip 42 extends downwardly from the bottom end of the outer wall 40. Lip 42 has a cylindrical outer surface 44, a narrow, radially extending bottom end surface 46, and an inner surface 48 which is tapered upwardly and radially inwardly from the bottom end surface 46. The outer surface 44 of lip 42 is of a diameter equal to the diameter of the top end of the outer wall 16 of container member 12. The bottom end surface 46 of lip 42 is of a width equal to the width of the ledge 24 at the top end of outer wall 16 of container member 12. The inner surface 48 of lip 42 is tapered at an angle corresponding to the angle of the outer surface 22 of lip 20 of container member 12. Thus, when the cover member 14 is seated on the top of container member 12 (see Figure 1), the lip 42 of the cover member 14 will overlap the lip 20 of the container member 12, with the inner surface 48 of the lip 42 matingly engaging the outer surface 22 of the lip 20, and the bottom end surface 46 of lip 42 seated on the ledge 24.

A threaded rod 50 is threaded through the hole 30 in the top end of stem 18. Rod 50 has a cylindrical head 52 on its bottom end which slidably fits in the bore 26 in stem 18. Head 52 is larger in diameter than the threaded hole 30 so that the head 52 will engage the shoulder 28 to limit the upward movement of the rod 50 through the hole 30. Rod 50 has a reduced diameter top end portion 54 which extends through and is secured in a central hole 56 in the top 38 of cover 14. Rod 50 is secured to the cover 14 so that the cover 14 cannot rotate relative to the rod 50. Thus, the rod 50 can be threaded through the hole 30 in stem 18 by rotating the cover 14. A ring 58 has a screw 60 extending therefrom which is threaded into a hole 62 in the top end surface of the upper end portion 54 of rod 50. A cord or chain 64 is secured to the ring 58.

The buck lure 10 of the present invention is used in the following manner:

The cover 14 of the buck lure 10 is rotated to thread the rod 50 upwardly through the stem 18 until the head 52 on the rod 50 engages the shoulder 28 of the stem 18 as shown in Figure 2. This lifts the cover 14 from the container member 12 of the buck lure 10 so as to expose the cotton 36 and sleeve 34 in the container member 12. The cotton 36 in the container member 12 is then saturated with a liquid which has the odor of a doe. The sleeve 34 will absorb the liquid from the cotton 36 until the sleeve 34 is also saturated with the liquid. The cover 14 is then rotated to thread the rod 50 downwardly through the stem 18 until the lip 42 of the cover 14 matingly engages the lip 20 of the container member 12 as shown in Figure 1. In this position of the cover 14, the container member 12 is completely enclosed by the cover 14 so that the odor from the lure liquid, which has saturated the cotton 36 and sleeve 34, cannot escape from the buck lure 10. The stem 18 and the rod 50 are of a length so that when the buck lure 10 is in its closed disposition, as shown in Figure 1, the stem 18 extends to substantially the top 38 of the cover 14, and the rod 50 is entirely within the stem 18.

With the buck lure 10 being in its closed disposition, the buck lure 10 can be carried about by the hunter without the buck lure 10 giving off the unpleasant odor of the lure liquid. Thus, the hunter can carry the buck lure 10 in the pocket of his coat, and the hunter's clothing will not be adversely affected by the lure liquid. When the hunter reaches the hunting site, he rotates the cover 14 of the buck lure 10 to lift the cover 14 from the container member 12, and expose the sleeve 34. The hunter then carries the buck lure 10 by the cord 64 so that the odor from the lure liquid in the sleeve 34 will attract to the hunter any buck in the vicinity of the hunter. When the hunting session is over, the hunter rotates the cover 14 of the buck lure 10 to return the cover 14 to its closed disposition around the container member 12. The hunter can then safely carry the buck lure 10 in the pocket of his coat until the next hunting session.

The present invention may be embodied in other specific forms without departing from the spirit or essential attributes thereof and, accordingly, reference should be made to the appended claims, rather than to the foregoing specification as indicating the scope of the invention.

I claim:

1. A buck lure comprising a cup-shaped container member having a tubular stem extending upwardly through the container member from the bottom of the container member, means in said container member for retaining a lure liquid having the odor of a doe, a cup-shaped cover, and a threaded rod fixedly secured to the top of said cover, said rod extending downwardly through said cover and threaded into said stem so that rotation of said cover and rod moves said cover between a closed disposition in which the cover fits tightly on said container member, and an open disposition in which said cover is raised above said container member.

2. A buck lure in accordance with claim 1 in which the means in the container member for retaining the lure liquid comprises a sleeve of absorbent material surrounding the stem, and a wad of absorbent material filling the container member.

3. A buck lure in accordance with claim 2 in which the stem of the container member projects beyond the top end of the container member, and the sleeve extends along substantially the full length of the stem.

4. A buck lure in accordance with claim 3 in which the outer surface of the stem of the container member has a thread on its outer surface, and the sleeve fits tightly around the stem.

5. A buck lure in accordance with claim 1 in which the container member has a lip projecting upwardly from the top edge thereof, the outer surface of said lip being tapered upwardly and radially inwardly from the top edge of the container member, and the cover has a lip projecting downwardly from the bottom edge thereof, the inner surface of said cover lip being tapered for mating engagement with the outer surface of the container member lip when the cover is in its closed disposition.

6. A buck lure in accordance with claim 1 in which the stem of the container member has a bore extending longitudinally therethrough from the bottom end thereof to a radial shoulder adjacent to but spaced from the top end of the stem, and a threaded hole of a diameter smaller than the diameter of the bore extending from the top end of the stem to said shoulder, and the rod is threaded through the threaded hole in said stem and has an enlarged head on the bottom end thereof slidably fitting in the bore of said stem, the head on said rod being engageable with the shoulder of said stem to limit upward movement of said rod through said stem.

7. A buck lure comprising a cup-shaped container member having a conical outer wall extending upwardly and radially outwardly from the bottom end of the container member, and a tubular stem extending upwardly through said outer wall from the bottom end of said outer wall, means in said container member for retaining a lure liquid having the odor of a doe, a cup-shaped cover having a flat top, and a conical outer wall extending downwardly and radially outwardly from said top, and a threaded rod secured to the inner surface of the top of said cover, said rod extending downwardly through said cover and threaded into said stem so that rotation of said cover and rod moves said cover between a closed disposition in which the cover fits tightly over said container member, and an open disposition in which said cover is raised above said container member.

8. A buck lure in accordance with claim 7 in which the means in the container member for retaining the lure liquid comprises a sleeve of absorbent material surrounding the stem, and a wad of absorbent material filling the outer wall of said container member.

9. A buck lure in accordance with claim 8 in which the stem of the container member projects beyond the top end of the outer wall of the container member, and the sleeve extends along substantially the full length of the stem.

10. A buck lure in accordance with claim 9 in which the outer surface of the stem of the container member has a thread on its outer surface, and the sleeve fits tightly around the stem.

11. A buck lure in accordance with claim 7 in which the container member has a lip projecting upwardly from the top edge of the outer wall thereof, the outer surface of said lip being tapered upwardly and radially inwardly from the top edge of the outer wall of said container member, and the cover has a lip projecting downwardly from the bottom edge of the outer wall thereof, the inner surface of said cover lip being tapered for mating engagement with the outer surface of the container member lip when the cover is in its closed disposition.

12. A buck lure in accordance with claim 7 in which the stem of the container member has a bore extending longitudinally therethrough from the bottom end thereof to a radial shoulder adjacent to but spaced from the top end of the stem, and a threaded hole of a diameter smaller than the diameter of the bore extending from the top end of the stem to said shoulder, and the rod is threaded through the threaded hole in said stem and has an enlarged head on the bottom end thereof slidably fitting in the bore of said stem, the head on said rod being engageable with the shoulder of said stem to limit upward movement of said rod through said stem.

References Cited in the file of this patent
UNITED STATES PATENTS

| | | |
|---|---|---|
| 2,713,744 | Strausser | July 26, 1955 |
| 2,791,058 | Bettini | May 7, 1957 |